United States Patent
Gorodyansky

(10) Patent No.: US 9,203,810 B2
(45) Date of Patent: *Dec. 1, 2015

(54) WEB VPN

(75) Inventor: David Gorodyansky, Mountain View, CA (US)

(73) Assignee: Anchorfree Inc., Menlo Park, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 13/190,275

(22) Filed: Jul. 25, 2011

(65) Prior Publication Data

US 2012/0023570 A1    Jan. 26, 2012

Related U.S. Application Data

(60) Provisional application No. 61/367,301, filed on Jul. 23, 2010.

(51) Int. Cl.
*G06F 15/16* (2006.01)
*G06F 17/30* (2006.01)
*H04L 29/06* (2006.01)
*H04L 29/08* (2006.01)

(52) U.S. Cl.
CPC ........ *H04L 63/0407* (2013.01); *H04L 63/0471* (2013.01); *H04L 67/02* (2013.01); *H04L 67/28* (2013.01); *H04L 63/0281* (2013.01)

(58) Field of Classification Search
USPC .......... 380/255–256, 270–274; 713/150–154, 713/160–163; 726/11–15
See application file for complete search history.

(56) References Cited

U.S. PATENT DOCUMENTS

| 8,495,709 B1* | 7/2013 | Cooper et al. ............ 726/4 |
| 2006/0143703 A1* | 6/2006 | Hopen et al. ............. 726/15 |
| 2006/0212361 A1* | 9/2006 | Perkowski ............. 705/26 |
| 2006/0265283 A1 | 11/2006 | Gorodyansky |
| 2006/0293962 A1 | 12/2006 | Malobrodsky et al. |
| 2009/0007278 A1* | 1/2009 | Yano et al. ............. 726/27 |
| 2010/0306048 A1* | 12/2010 | Corduneanu et al. ...... 705/14.45 |
| 2011/0055915 A1* | 3/2011 | Hall et al. ............. 726/12 |

OTHER PUBLICATIONS http://www.anchorfree.com/about.php, printed out in year 2013.*

(Continued)

*Primary Examiner* — Evans Desrosiers
(74) *Attorney, Agent, or Firm* — TransPacific Law Group; Pavel I. Pogodin, Esq.

(57) ABSTRACT

Web-based VPN system and corresponding service. The inventive web VPN system/service could be accessed by the users using only a conventional web browser without the need to install any specialized VPN client software on the user terminal, as it is the case with conventional VPN systems. User's terminal could be a user's desktop computer, notebook or a mobile device, such as a cell prone or a PDA, or any other computing platform what so ever, used by the user to access various network resources, such as web pages. One aspect is a web VPN service that encrypts, using, for example, SSL encryption, all web traffic going between the user's terminal and the Internet. System comprises a VPN server/proxy and an associated web server accessible by the user via a communication network, such as Internet. The web server associated with the VPN server/proxy communicates with the latter and enables the user to access and use the functionality provided by the private VPN server/proxy by means of a conventional web browser installed on the user's terminal.

12 Claims, 8 Drawing Sheets

(56) References Cited

OTHER PUBLICATIONS

A Framework for the establishment of inter-domain, on-demand VPNs; Matos, A. ; Matos, F. ; Simoes, P. ; Monteiro, E. Network Operations and Management Symposium, 2008. NOMS 2008. IEEE Publication Year: 2008 , pp. 232-239.*
Pervasive service access with SIM-based VPN; van Thanh, D. ; Jrstad, I. ; Johansen, T.A. ; Bakken, E. ; van Thuan, D. Mobile Adhoc and Sensor Systems, 2009. MASS '09. IEEE 6th International Conference on Publication Year: 2009 , pp. 836-841.*
Network virtualization: state of the art and research challenges; Chowdhury, N.M.M.K. ; Boutaba, R. Communications Magazine, IEEE; vol. 47 , Issue: 7 Publication Year: 2009 , pp. 20-26.*
Hotspot Shield VPN Software News, Events, Press Center & Inquiries—AnchorFree, printed out in year 2013.*
Ad Words Management Tips—International Targeting—Pure Visibility; by Steve Loszewski Jun. 30, 2009.*
Control Freaks: Hulu Now Blocks Anonymous Proxies Too; MG Siegler Wednesday, May 6, 2009.*
Samir Jain Senior Program Manager Windows Networking; VPN tunnel strategy—defining the connection order between various tunnel types; rrasblog Feb. 11, 2009 3:54 AM.*
Technical Brief: Malware Prevention with Blue Coat Proxies; Copyright © 2007 Blue Coat Systems.*
Bookmarklet; From Wikipedia, the free encyclopedia, printed out in year 2013.*
Key-Private Proxy Re-Encryption; Giuseppe Ateniese; year 2009.*
Workshop on Web 2.0 Security and Privacy; Oakland, CA; May 22, 2008; Privacy Protection for Social Networking Platforms; Adrienne Felt; year 2008.*

* cited by examiner

WEB VPN

CROSS-REFERENCE TO RELATED PATENT APPLICATIONS

The present application relies on and claims benefit of priority under 35 U.S.C. 119 from U.S. provisional patent application Ser. No. 61/367,301, filed on Jul. 23, 2010, which is incorporated by reference herein in its entirety.

BACKGROUND OF THE INVENTION

1. Field of the Invention

The present invention relates generally to providing virtual private network (VPN) services to users and, more specifically, to techniques for enabling users to utilize virtual private network (VPN) services using only a web browser.

2. Description of the Related Art

Virtual private networks (VPNs) can be used to provide a layer of security and anonymity to Internet users. Specifically, in a typical configuration, a secure VPN connection is established between a user's terminal 101 and a VPN server/proxy 102, as shown in FIG. 1. According to the conventional VPN protocol, the user terminal 101 sends a request 104 to the VPN server/proxy 102 for the Internet resource 103. The request 104 may be sent via a secure channel, wherein all the transmitted information is encrypted. In response to receiving the request 104, the VPN server/proxy 102 sends a request 105 to the Internet resource 103 requested by the user. However, the VPN server/proxy 102 is configured to mask the information identifying the user terminal 101 from the request 105. Such information that is being masked includes, for example, user's IP address. Upon the receipt of the request 105, the Internet resource 103 provides a response 106 to the VPN server/proxy 102. The VPN server/proxy 102, in turn, forwards (107) this response to the client 101 via a secure channel. Because of the presence of the secure channel 104/107 and the masking of the IP address by the VPN server/proxy 102, the Internet resource 103 or any other Internet entity does not detect any information identifying the client terminal 101, which initiated the request. Thus, user's security and anonymity is achieved.

In accordance with the conventional technique, the operation of the above-described conventional VPN system requires installation of a special VPN client software on the user's terminal 101, which could be a desktop computer, a notebook, or a mobile device. The function of this client is establish a secure communication tunnel with the VPN server on the network and to encrypt and decrypt the respective communications with such VPN server. On the other hand, in many situations, a user using the terminal 101 may not have the ability to install such special VPN software. Specifically, it is possible that the user would not have the appropriate permissions from the system administrator of the terminal platform 101, such as when the terminal 101 is installed at a public location or when the installation of additional software on the terminal 101 is prohibited by a security policy of an organization. In other situations, appropriate VPN client software may simply not be available for the operating system of the terminal 101.

Thus, it is desirable to have a system and method, wherein the user may use the private VPN services available on the network, such as Internet, without having to install and execute the specialized VPN client software application within the operating system environment of the terminal 101. In particular, it would be desirable to have a VPN system that users can access and use by means of only a web browser.

SUMMARY OF THE INVENTION

The inventive methodology is directed to methods and systems that substantially obviate one or more of the above and other problems associated with conventional techniques for enabling user access to private VPN services.

In accordance with one aspect of the inventive concept, there is provided a computerized system and associated method, the system incorporating a virtual private network and proxy server operable to provide a virtual private network service, the virtual private network service enabling a user of a user terminal to retrieve at least one Internet resource from a content provider; and a web server communicatively coupled with the virtual private network and proxy server and with the user terminal and operable to furnish the retrieved Internet resource to the user terminal via a secure data transmission protocol. In the inventive system, the web server is further operable to provide to the user terminal a control panel accessible using a web browser, the control panel configured to receive the information on the Internet resource from the user and to transmit the information on the Internet resource to the virtual private network and proxy server, and the virtual private network and proxy server is configured to keep an identity of the user private from the content provider.

In accordance with another aspect of the inventive concept, there is provided a computerized system and associated method, the system incorporating a virtual private network and proxy server operable to provide a virtual private network service, the virtual private network service enabling a user of a user terminal to retrieve at least one Internet resource from a content provider; and a web server communicatively coupled with the virtual private network and proxy server and with the user terminal and operable to furnish the retrieved Internet resource to the user terminal via a secure data transmission protocol. In the inventive system, the web server is further operable to provide the user terminal with a bookmarklet enabling the user to create a bookmark redirecting the user to the Internet resource through the virtual private network and proxy server and the virtual private network and proxy server is configured to keep an identity of the user private from the content provider.

In accordance with yet another aspect of the inventive concept, there is provided a computerized system and associated method, the system incorporating a computerized system comprising: a virtual private network and proxy server operable to provide a virtual private network service, the virtual private network service enabling a user of a user terminal to retrieve at least one Internet resource from a content provider; and a web server communicatively coupled with the virtual private network and proxy server and the user terminal and operable to furnish the retrieved Internet resource to the user terminal via a secure data transmission protocol. In the inventive system the web server is further operable to receive the information on the Internet resource from the user terminal via an HTTP request and to transmit the information on the Internet resource to the virtual private network and proxy server and the virtual private network and proxy server is configured to keep an identity of the user private from the content provider.

In accordance with yet another aspect of the inventive concept, there is provided a computerized system and associated method, the system incorporating a computerized system comprising: a privacy mediator enabling a user of a user terminal to retrieve at least a first content from a content provider and to post at least a second content to the content provider, the privacy mediator operable to encrypt at least a portion of the second content and decrypt at least a portion of the first content; and a web server communicatively coupled with the privacy mediator and the user terminal and operable to furnish the retrieved first content to the user terminal via a secure data transmission protocol. In the inventive system, the web server is further operable to receive the second content from the user terminal using the secure communication protocol and to transmit the second content to the privacy mediator for at least partial encryption and posting to the content provider.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
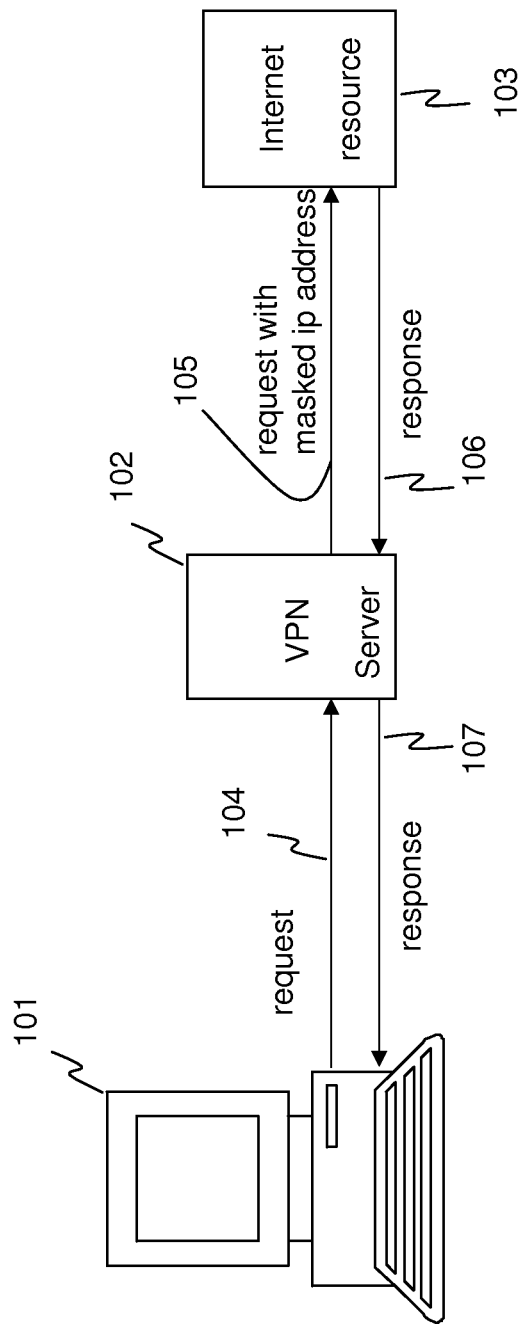
FIG. 1 illustrates a schematic diagram of an exemplary conventional VPN implementation.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the inventive methodology provide systems and methods for implementing web-based VPN system and corresponding service. In one embodiment of the invention, the inventive web VPN system/service could be accessed by the users using only a conventional web browser without the need to install any specialized VPN client software on the user terminal 101, as it is the case with conventional VPN systems. It should be noted that the user's terminal could be a user's desktop computer, notebook or a mobile device, such as a cell prone or a PDA, or any other computing platform what so ever, used by the user to access various network resources, such as web pages.

One aspect of the inventive technology is a web VPN service that encrypts, using, for example, SSL encryption, all web traffic going between the user's terminal 101 and the Internet. In one embodiment of the invention, the inventive system comprises a VPN server/proxy and an associated web server accessible by the user via a communication network, such as Internet. The aforesaid web server associated with the VPN server/proxy communicates with the latter and enables the user to access and use the functionality provided by the private VPN server/proxy by means of a conventional web browser installed on the user's terminal 101. In one embodiment, the VPN server/proxy and the web server are integrated, within the same hardware platform, or otherwise. In another embodiment, the VPN server/proxy and the web server are deployed on separate hardware or software platforms, within different execution environments or otherwise in a separate manner.

In one or more embodiments of the invention, the user uses the web-accessible control interface (web page) provided by the web server associated with the VPN server/proxy to input destination URLs, perform web searches and otherwise access the Internet. In this embodiment, all Internet traffic between the user's terminal 101 and the web server and VPN server/proxy is encrypted using, for example, SSL encryption technology well known to persons of skill in the art. Thus, because SSL is used to encrypt all the user's communications with the Internet (including requests or data sent by the user as well as received information), the user's terminal 101 is protected from various security threats and/or malicious attacks to which it would have been vulnerable in case of the use of an unencrypted connection to the Internet.

For example, if the user is located in a coffee shop or other location where his network communications could be eavesdropped on or otherwise intercepted, using the inventive VPN system/service would protect the user against any security breaches with respect to any information that user sends to or accesses on the Internet and not only websites that use SSL encryption technology. It should be noted that even though some websites do use SSL encryption, the majority of web resources do not. Thus, the use of the inventive VPN technology would protect the user even when the website accessed by the user does not support the SSL.

Figure 2:
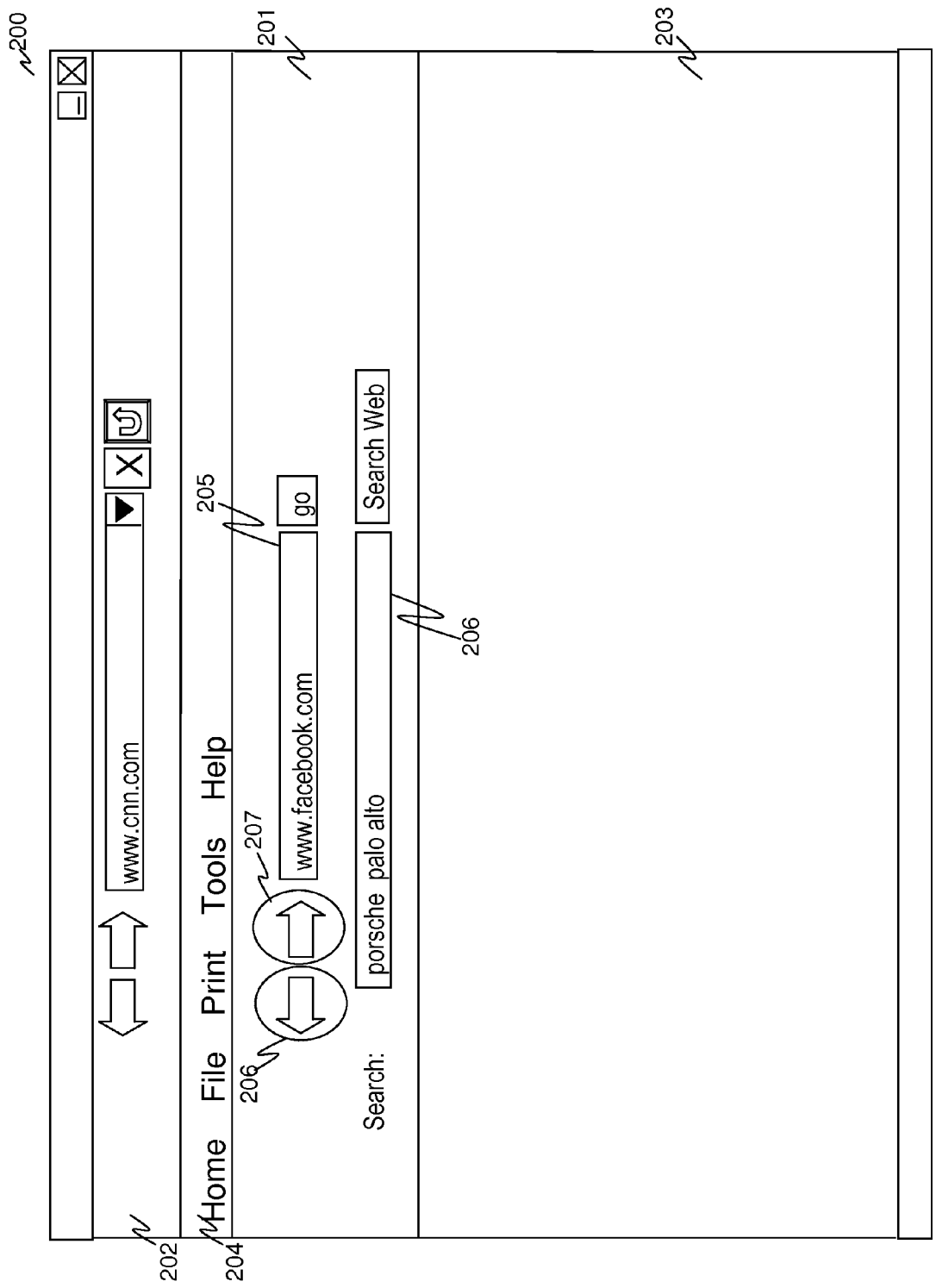
FIG. 2 illustrates an exemplary embodiment of a web-accessible control interface of the inventive web VPN system.

FIG. 2 illustrates an exemplary embodiment of a web-accessible control interface of the inventive web VPN system, as seen by the user using a conventional browser window 200. The web page that the user uses to control the inventive web VPN system is provided by the inventive web server associated with the inventive VPN server/proxy. In FIG. 2, the conventional browser 200 includes its own navigation bar 202 and toolbar 204. The inventive web server causes the conventional browser 200 to display a navigation/search bar 201, which is used to control the inventive web VPN system. In one embodiment of the invention, the inventive navigation/search bar 201 is implemented using HTML language code, which is inserted at the top of every web page provided by the inventive web server to the user.

As shown in FIG. 2, the area 203 below the navigation/search bar 201 is used to display the target content to the user. In one embodiment of the invention, the navigation/search bar 201 includes a URL input field 205, as well as navigation buttons 206 and 207. The URL input field 205 is used by the user to go directly to various web resources that the user can specify using the corresponding known URL, such as www-.facebook.com. After the user inputs the URL for the target web resource and activates the "go" button, the requested content as specified by the URL provided by the user is displayed to the user in the content display area 203. To this end, the URL specified by the user is sent, using SSL encryption, through the inventive web browser to the VPN server/proxy (not shown). The VPN server/proxy uses the received URL to access the target resource and forwards the target resource to the user's browser again by means of the SSL encryption. Additionally, the user's identity information, such as user's IP address, is masked from the provider of the target resource. Thus, the user of the inventive web VPN system remains secure and anonymous on the Internet.

After the target content has been displayed to the user, the user can use various navigation tools, such as links or form submissions, within the displayed target content, as well as navigation buttons 206 and 207 within the inventive navigation/search bar to navigate away from the displayed content to other Internet resources. In one or more embodiments of the invention, the navigation/search bar 201 is always displayed to the user while the user continues using the inventive web VPN system. During the user's VPN session with the web VPN system, all content viewed by the user and all the information, such as requests and data, that the user sends to the Internet is securely encrypted, respectively, by the VPN server/proxy as well as user's own browser. In an embodiment of the invention, the encryption can be performed using the SSL protocol, well known to persons of skill in the art. Thus, the user's security and privacy on the web is provided.

In one or more embodiments of the invention, in addition to the aforesaid URL input field and the aforesaid navigation buttons, the navigation/search bar 201 includes a search query input field 206, which can be used by the user to input search terms or search phrases for use in performing web searches by means of a predetermined search engine associated with the inventive web VPN system/service. In another embodiment of the invention, the inventive system has the ability to use multiple alternative search engines and the specific search engine for performing web searches may be specified by the user using the web interface provided by the inventive web server. After the user has input the search query into the input field 206 and activated the "Search Web" button, the user's web browser transmits the search query to the web server associated with the inventive VPN server/proxy, which, in turn provides it to the predetermined or specified search engine. In accordance with one or more embodiments of the invention, the transmitted search query is encrypted using, for example, SSL encryption. The search results received by the VPN server/proxy from the search engine in response to the search query are then forwarded to the user by the web server associated with the inventive VPN server/proxy via the secure channel encrypted using, for example, SSL encryption. Thus, both the user's search query and the search results are protected. In addition, the user's identity is masked from the search query received by the search engine by the inventive VPN server/proxy. Thus, the inventive web VPN system protects the user's privacy on the Internet.

Using the shown implementation of the navigation/search bar 201, which is provided by the web server associated with the inventive VPN server/proxy, the user can navigate the Internet and perform web searches using one or more search engines. The user's target URLs, navigation commands and search queries that the user inputs into the inventive navigation/search bar 201, which is provided at the top of the content displayed to the user, are sent by the user's web browser using secure HTTPS protocol (SSL encryption) to the inventive web server. The web server uses HTTPS protocol to receive and decrypt the information received from the user and provides the decrypted information to the inventive VPN server/proxy, which forwards search requests to search engine(s), handles the received search results and fetches the content requested by the user. The content requested by the user as well as search results are sent to the user's browser by the inventive web VPN system using SSL encryption.

Figure 3:
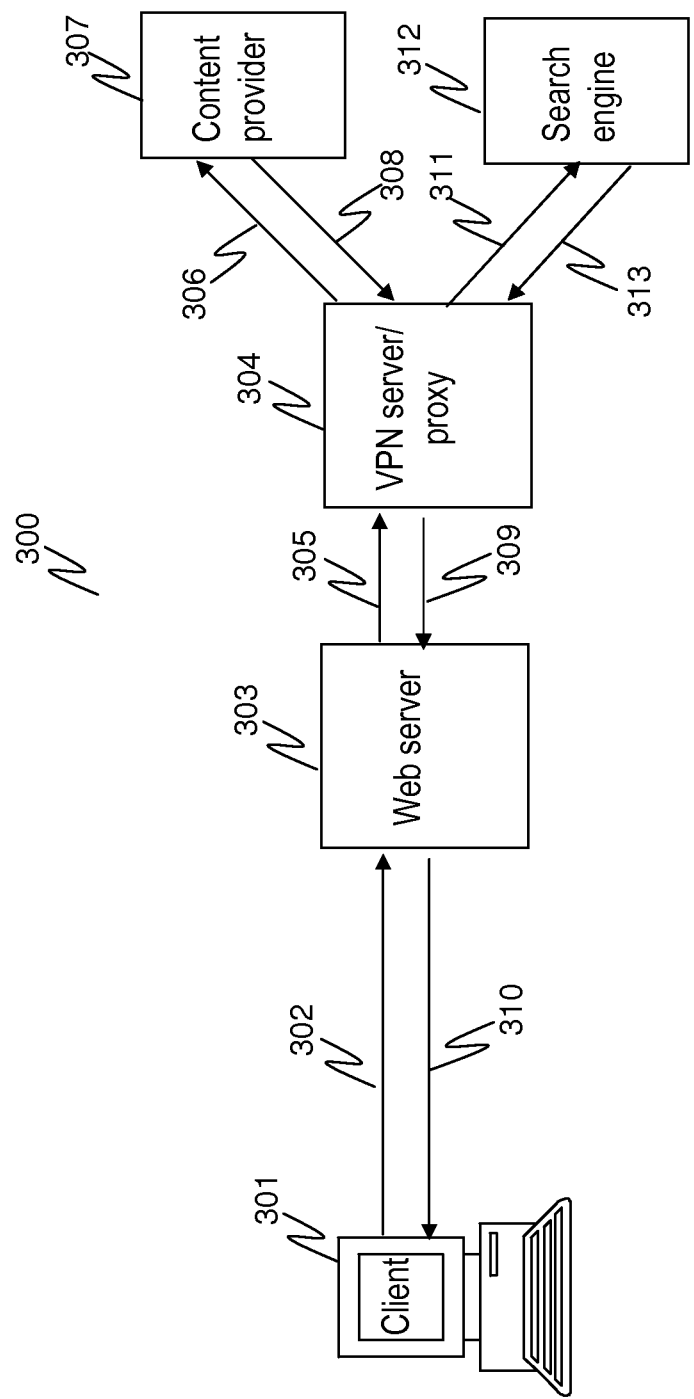
FIG. 3 illustrates an exemplary embodiment of the inventive web VPN system.

FIG. 3 illustrates an exemplary embodiment of the inventive web VPN system 300. The client terminal 301 executes an Internet browser application (not shown), which displays to the user the navigation/search bar 201. The user uses the navigation/search bar 201 to input target URLs, issue navigation commands and specify search queries. This information 302, which may include any of the above-specified types of information, is transmitted by the web browser using HTTPS protocol to the inventive web server 303, which decrypts the received information and provides it to the VPN server/proxy 304. The VPN server/proxy 304 forwards the received search query to the search engine 312 using HTTP or HTTPS protocol (311) and receives back search results 313 from the search engine 312. The search results are then sent to the web server (309) and subsequently back to the user's terminal (310), where they are displayed to the user using Internet browser. The search results may be sent to the client terminal 301 via HTTPS protocol, which utilizes the SSL encryption. The VPN server/proxy 304 also uses URLs specified by the user to send requests (306) for content specified by the user. The content is obtained from a content provider 307. The received content 308 is forwarded to the web server 303 and then back to the user's terminal, where it is displayed to the user. Again, the retrieved content is sent back to the client terminal using secure HTTPS protocol.

In one or more embodiments of the invention, the inventive web VPN service turns all the network traffic to and from the user (client) terminal 301 from the insecure HTTP protocol to the secure HTTPS protocol, both of which are well-known to persons of skill in the art. In an embodiment of the invention, the functions of the VPN client which is used by the user to access the VPN service are entirely performed by the user's browser and the user does not need to download or install any specialized software in order to use the inventive private VPN service.

Figure 4:
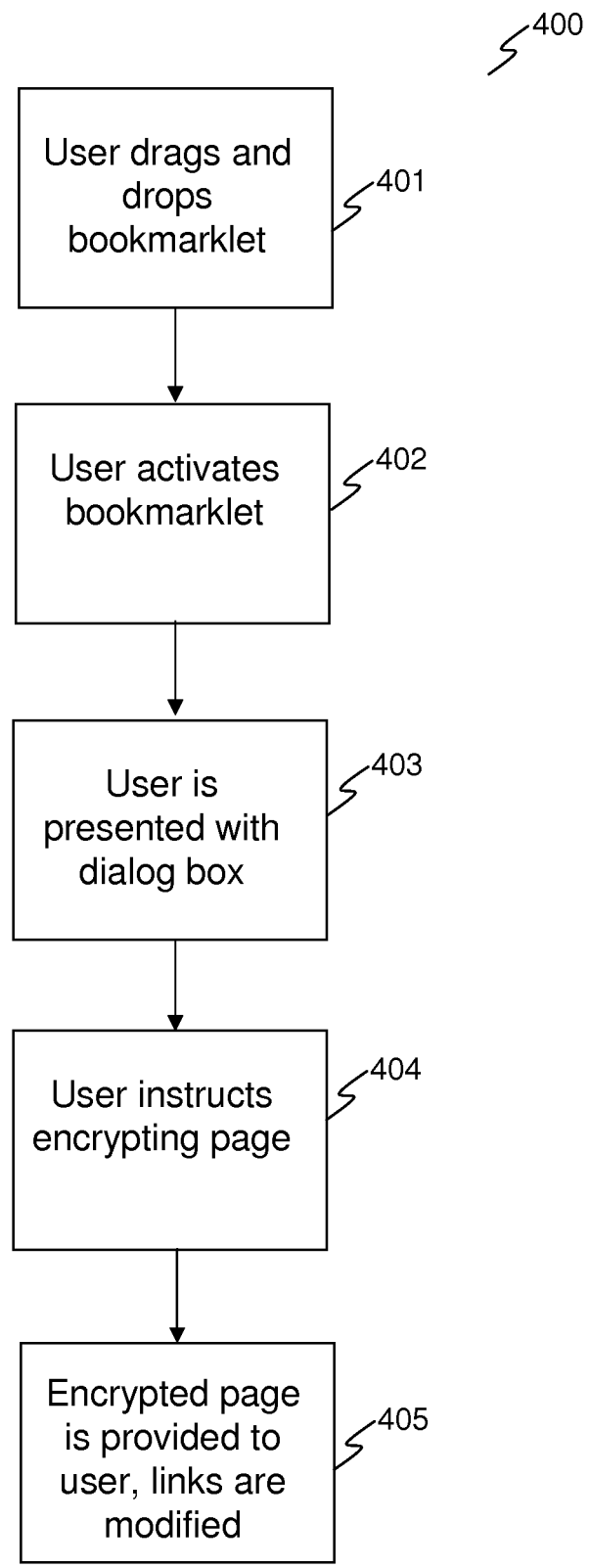
FIG. 4 illustrates an operating flow of an exemplary embodiment of the inventive web VPN system.

In one or more embodiments of the invention, illustrated in FIG. 4, users drag and drop, using a mouse action, a bookmarklet from a web page provided, for example, by the inventive web server associated with the VPN server/proxy onto their browser's navigation bar, see step 401. It should be noted that most Internet browsers, including Mozilla Firefox and Internet Explorer provide functionality for simply dragging and dropping a bookmarklet, associated with a URL into the browser navigation bar. Thus, when the user performs the aforesaid mouse gesture, a bookmarklet icon or button is created on the navigation bar of the user's browser, the aforesaid button being associated with the URL. Activation of the aforesaid button (bookmarklet) operates to execute the applet associated with the bookmarklet, see step 402. In one or more embodiments of the invention, the aforesaid applet, upon activation, opens a dialog box asking the user whether the user prefers to encrypt the current content (web page) viewed by the user, see step 403. If the user clicks on "Yes" button of said dialog box, the bookmarklet applet creates a bookmark corresponding to the URL of the content currently accessed by the user, see step 404. It should be noted that said bookmark operates to send the user accessing the bookmark to the target content through the inventive VPN server/proxy and the associated web server. In one or more embodiments of the invention, this is accomplished by appending the URL of the web resource accessed by the user to the URL of the web server associated with the inventive VPN server/proxy. For example, the bookmark may be in the form similar to: "www.secureserver.com/?url=webpage.com_index.html."
The first part of the above URL specifies the web server of the inventive VPN system and the second part thereof specifies the target content to be accessed. When the user activates the bookmark, the user will be sent to the target content through the inventive VPN server/proxy and the associated web server, which perform the encryption operation on the target content, see step 405.

As would be appreciated by persons of skill in the art, the inventive methodology operates to send all data traffic between the user's browser and the Internet through the SSL-encrypted tunnel and any content accessed by the user will be provided to the user's browser using HTTPS protocol. Specifically, activating the aforesaid bookmark causes the user to be redirected to the target Internet resource through the inventive VPN server/proxy and the associated web server. Subsequently, all user requests and all resources retrieved from the Internet during the user's browsing session first pass through the inventive web VPN and are encrypted using SSL technology. To this end, in one or more embodiments of the invention, the links on the web pages provided to user through the inventive VPN server/proxy and the associated web server are re-written in such a form that when the user activates those links, the user is directed to the linked resources also through the inventive VPN server/proxy and the associated web server, see step 405. This feature provides the user with a continuously secured connection throughout the session. Thus, the users are provided with the capability to encrypt the entire web, including pages that do not support SSL, by clicking on the inventive bookmarklet button in the navigation bar of any browser. It should be noted that in this embodiment of the invention, the users can use the regular navigation bar of a browser to navigate the Internet. This provides the user with enhanced security and privacy on the Internet.

In yet another embodiment, various websites may be provided with a special "HTTP(S)" button posted thereon. This button provides any user visiting the website with the ability to click on this button located on the website and have all communications to and from this website be converted from the insecure HTTP protocol to the secure HTTPS protocol (even if the pages in the website do not support HTTPS). This is again accomplished by associating the aforesaid button with a URL, which redirects the user's browser to the website through the inventive VPN server/proxy and the associated web server. Thus, when the user activates this button located on the website, the user is redirected to the same website through the inventive VPN server/proxy, which secures the connection between the user's browser and the Internet. Once the user is provided with the secure version of a web page of the website through the inventive VPN server/proxy and the associated web server, all links on the web page provided to the user through the inventive VPN server/proxy and the associated web server are re-written in such a form that when the user activates those links, the user is directed to the linked resources also through the inventive VPN server/proxy and the associated web server. This ensures user's continued security and privacy throughout the session.

It should be noted that the inventive technology is capable of creating encryption protection for websites that do not support encryption of information, such as SSL encryption, without the need for such websites to purchase SSL certificates. This also puts the user in control of having the option of encrypting the entire web (all pages that the user visits can be encrypted by user's choice).

Figure 5:
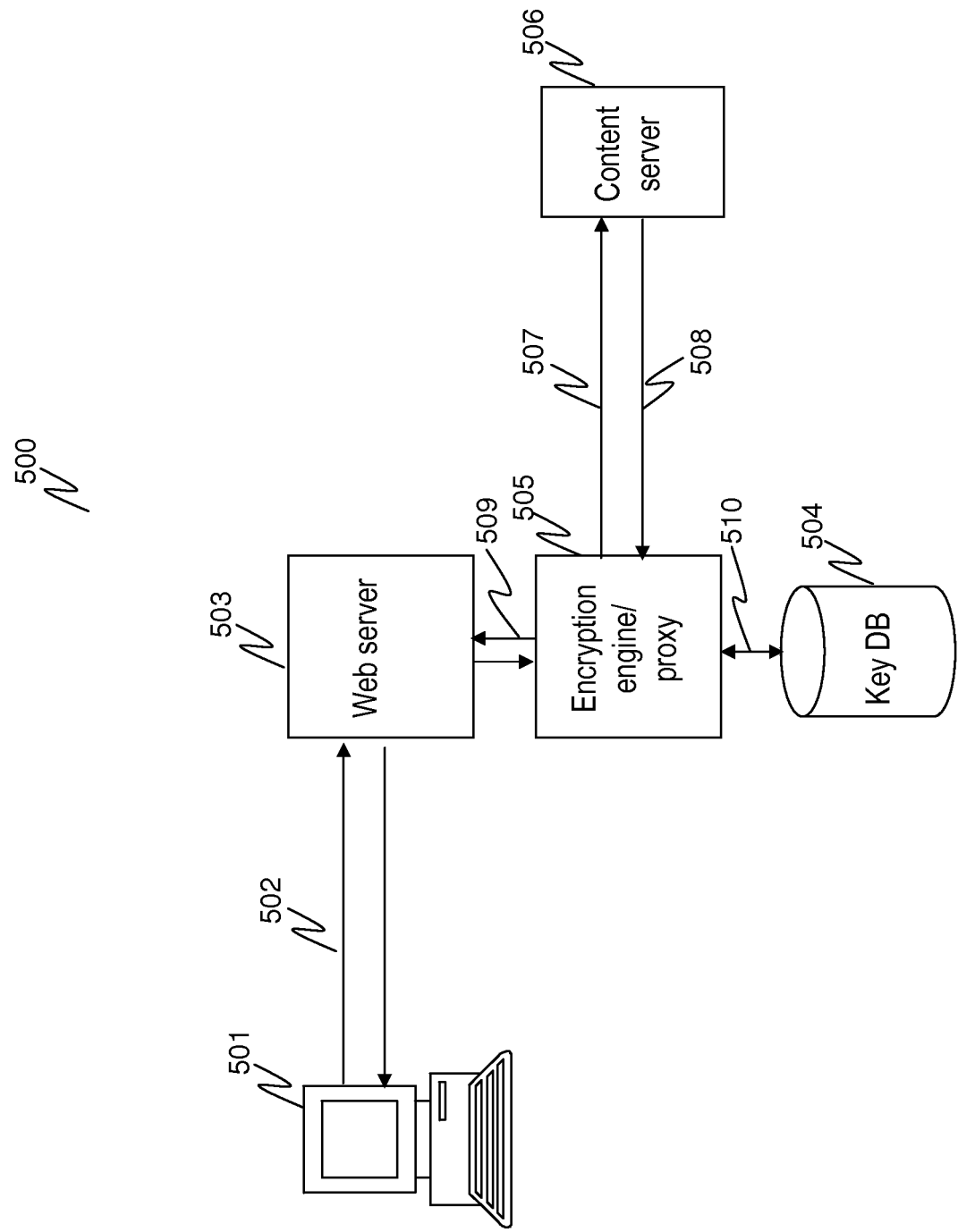
FIG. 5 illustrates an exemplary embodiment of the inventive security/privacy mediator.

In yet another embodiment of the invention, the user is provided with an optional access to online content through security and/or privacy mediator. In one implementation, the security/privacy mediator comprises an encryption/decryption engine, accessed through an associated web server and positioned between the user and the provider of the target content, as shown in FIG. 5. As shown in this figure, the security/privacy mediator incorporates an encryption engine/proxy 505 coupled with a web server 503. The web server is configured to enable web access to the functionality of the encryption engine/proxy 505, while the encryption engine/proxy 505 is configured to access or send content specified by the user and to perform encryption/decryption operation with respect to the accessed/sent content.

As with the above-described embodiments, the target content is accessed through the security/privacy mediator 503/505 by re-writing the URL of the target content in such a way as to have the user redirected to the target content through the security/privacy mediator 503/505. In one embodiment, the re-written URL maybe in the form: "www.securitymediator.com/?url=webpage.com_index.html." In one or more embodiments, a corresponding browser bookmark is created, the browser bookmark being associated with the re-written URL, to enable one-click assess of the target content through the security/privacy mediator 503/505 by the user.

In one or more embodiments of the invention, the inventive system stores the encryption keys in the key database 504 accessed by the security/privacy mediator 503/505. In another embodiment, the user specifies the key at the beginning of the work session with the security/privacy mediator.

In one or more embodiments of the invention, the security/privacy mediator 503/505 encrypts certain information the user sends to the content server 506. For instance, if the content server 506 is communication website, the user's message sent to this website would be encrypted with a key, making said message private. In order to enable another user (recipient) to decrypt the message, the user needs to provide the recipient with the decryption key, which may be the same (symmetric key) or different (asymmetric key) from the encryption key. Once the recipient is in possession of the decryption key, he or she can access and decrypt the received message using the same security/privacy mediator 503/505. To this end, the recipient may be provided with a URL for the message re-written to redirect the recipient to the communication website using the inventive security/privacy mediator 503/505.

In one or more embodiments of the invention, the user can configure the security/privacy mediator 503/505 to specify which content to encrypt and which is not to encrypt. Specifically, if the content server is an email server, the user may be enabled to specify which fields of an email message the security/privacy mediator 503/505 should encrypt. In one embodiment of the invention, the subject line of the email message and the body of the email message are encrypted. The remaining data fields of the email message are not encrypted. The information regarding the fields to be encrypted may be stored in the user preferences section of the user's account or area with the security/privacy mediator 503/505. In one embodiment of the invention, the security/privacy mediator 503/505 is configured to authenticate the user before performing encryption/decryption operations on behalf of the user in order to have access to user's preferences and authorizations.

In one exemplary scenario, two users can use the inventive security/privacy mediator 503/505 to communicate through a social networking website in a secure manner. The user would first configure the security/privacy mediator 503/505 to encrypt certain data fields of an html form posted on the social networking website. The user would then use the security/privacy mediator 503/505 to access the social networking website and input the message to a recipient using the aforesaid html form. The security/privacy mediator 503/505 would automatically encrypt user's input based on the specified encryption configuration and post the encrypted information to the social networking site. The security/privacy mediator 503/505 would leave the remaining fields unchanged.

Thereafter, the user would either provide the decryption key to the recipient or identify the recipient to the security/privacy mediator 503/505. In the first instance, the recipient would input the received decryption key into the security/privacy mediator 503/505 and use it to access the message from the user, whereupon the security/privacy mediator 503/505 would decrypt the message using the provided decryption key, enabling the recipient to view the message. In the second scenario, the security/privacy mediator 503/505 would automatically decrypt the message with the appropriate key, upon verifying that the recipient is the person identified by the user to the security/privacy mediator 503/505 as the intended recipient of the message.

On the other hand, any other user, who does not possess the security key or who was not designated by the user as the recipient of the message would not be able to read the message. The above exemplary method could be applied for private communication through a variety of web-enabled systems including web-enabled email services, social networking websites, billboards, web blogs, and any similar communication means with web access.

In one or more embodiments of the inventive concept, any content provider (website) could offer a choice of accessing the content through the security/privacy mediator 503/505 or in a conventional way (after login, or just implicitly consenting to collection of behavior info). If the user opts for private and/or secure access, additional or different advertisements could be displayed to the user, however the user would receive privacy protection from a trusted independent third party. Advantages of such protection may include hidden IP address, possibly different cookies/short-term cookies etc. In one or more embodiments of the invention, the content provider may post a link on its website redirecting the user to content through the security/privacy mediator 503/505. The link may me associated with the URL modified as specified above.

In any of the above-described embodiments of the inventive web VPN system, the costs of providing the aforesaid VPN service to users may be subsidized using advertising. The advertising materials may be inserted into the content accessed by the user using the inventive VPN server/proxy and the associated web server. Revenue generated by the operator of the inventive VPN server/proxy and the associated web server is used to offset the costs of operation thereof.

In accordance with an embodiment of the inventive system, there is provided advertising targeting based on user's geo preference. First, the user selects different geo regions (country, zip code) to be presented to content providers and advertisers, while real user's geo region remains the same. The advertisement requests sent to the same database contain different geo region identifiers as selected by the user. In accordance with an embodiment of the invention, same user, connected to the inventive VPN server/proxy, receives different geo-targeted ads depending on the user's selection of geo region.

In accordance with an embodiment of this invention, geographical preference information is made specific to a particular Internet site or to a particular content request. For example, user may specify a preference for the IP address from the United Kingdom for requests to all domains registered in the UK (for instance, ending with "co.uk"), or only for requests to specific sites (for instance, http://www.bbc.co.uk), while also specifying preferences for IP addresses from the United States for all other content requests. In this way, users will enjoy content allowed only for requests with UK-specific IP addresses (such as UK-specific video content from http://www.bbc.co.uk), while receiving content targeted to US users from other sites (such as US-specific video content from http://www.hulu.com). In accordance with one embodiment of the invention, site-specific geographic preference is applied both to the content and to one or more advertisements displayed on the site. In accordance with one embodiment of the invention, site-specific geographic preference is applied both to the content and to one or more advertisements displayed on the site. In accordance with another embodiment of the present invention, different content elements on the same web page may be associated with different geographic preferences. For instance, user may receive content from UK-based sites in response to a request issued from UK-based IP addresses, while receiving advertisements displayed on that site in response to a request issued from US-based IP addresses.

In accordance with a feature of the inventive methodology, the inventive VPN server/proxy is operable to receive from the user a selection of language wherein the inventive VPN server/proxy is further operable to alter the user's online identity to reflect the selected language. The selection of the language indicates preferred content display language of the user and the online content of the user defers depending on the language selection.

In accordance with an embodiment of the inventive system, there is provided a method for using one inventive VPN server/proxy with multiple IP addresses. Pursuant to the inventive method, the service has at least one inventive VPN server/proxy capable of sending requests to the content servers while using any of 2 or more IP addresses belonging to different countries; user specifies conditions of IP address to use when establishing tunnel (for instance, country); request from the inventive VPN server/proxy to the content server is sent while using IP address corresponding to specified conditions.

Figure 6:
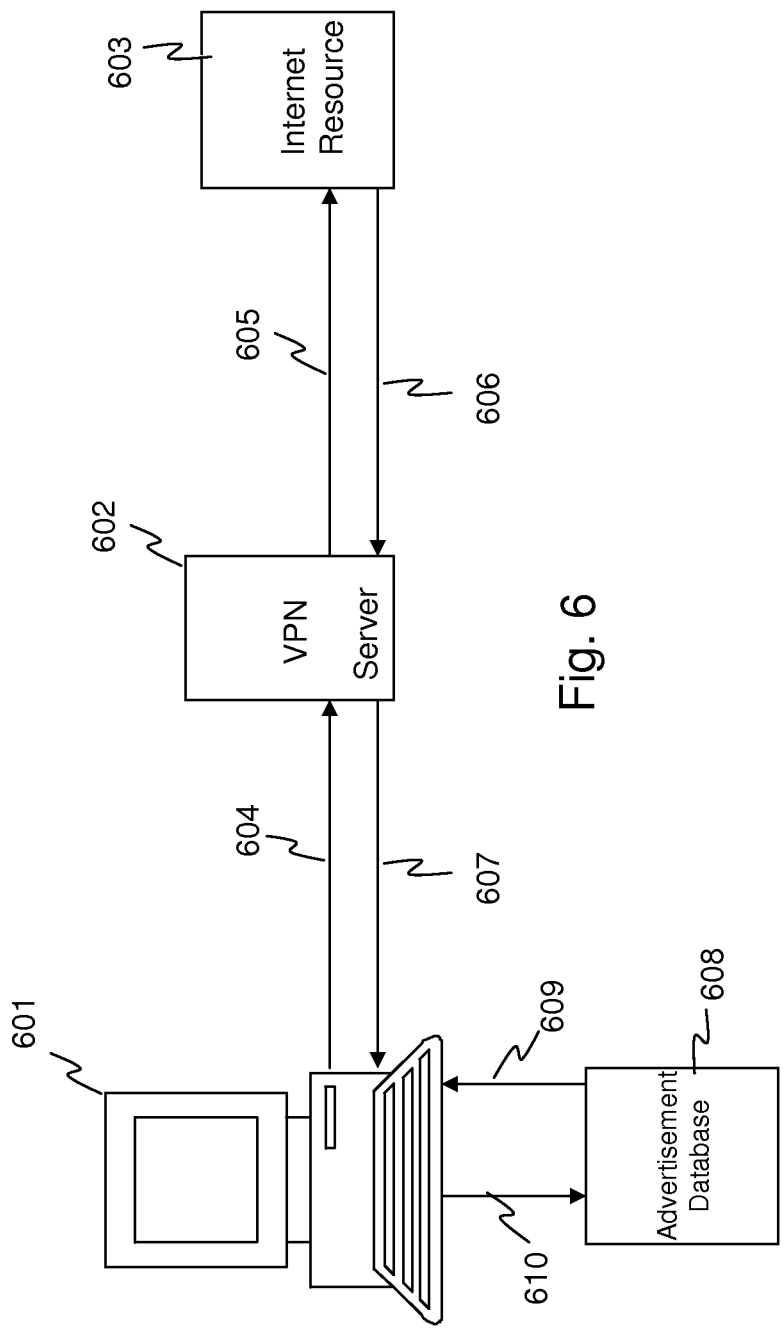
FIG. 6 illustrates an exemplary embodiment of inventive advertising-subsidized web VPN system.

FIG. 6 illustrates an exemplary embodiment of inventive advertising-subsidized web VPN system. In an embodiment of the inventive system, the client terminal 601 executes a web browser software (not shown). The inventive VPN server/proxy operates to insert advertisements into every web resource (such as web page) received by the client terminal 601. The inventive VPN server/proxy may either insert actual advertisements or links to advertisements (using, for example, HTML frames) into the content received by the user. In the latter case, the actual advertisements would be downloaded by the user's own web browser from, for example, a designated advertisement server located on the Internet and inserted into the content viewed by the user.

The user terminal 601 first sends a request 604 to the inventive VPN server/proxy 602 for the Internet resource 603. The request 604 may be sent via a secure channel, wherein all the transmitted information is encrypted using, for example SSL. In response to receiving the request 604, the inventive VPN server/proxy 602 sends a request 605 to the Internet resource 603 requested by the user. However, the inventive VPN server/proxy 602 is configured to mask the information identifying the user terminal 601 from the request 605. Such information that is being masked includes, for example, user's IP address. Upon the receipt of the request 605, the Internet resource 603 provides a response 606 to the inventive VPN server/proxy 602. The inventive VPN server/proxy 602, in turn, forwards (607) this response to the client 601 via the secure channel. Because of the presence of the secure channel 604/607 and the masking of the IP address by the inventive VPN server/proxy 602, the Internet resource 603 or any other Internet entity does not detect any information identifying the client terminal 601, which initiated the request. Thus, user's security and anonymity is achieved.

To subsidize the costs of such service, advertisements are shown to the users. In one embodiment, the inventive VPN server/proxy 602 inserts one or more advertisements into the information sent to the user of the user terminal 601. In an embodiment of the invention shown in FIG. 6, the client terminal 601 receives the advertisements to be inserted into the content from the advertisement database 608. To this end, the links to the appropriate advertisements are inserted into the target content by the inventive VPN server/proxy 602.

In one embodiment of the invention, the advertisements served to the users are targeted based on the user's online behavior. To this end, an application executing on the client terminal is operable to collect information on the user's online activities and store this information for subsequent use. At the time of the user request 604 or at the time the information 607 is received by the user terminal 201, the software residing on the client terminal 601 may make a determination regarding the nature of the advertisement to be shown to the user. The decision on the type of the advertisement may be based on the user's prior online activities stored at the client terminal 601 as well as the nature of the user's request 604 and/or the nature of the information 607.

Thus, in one embodiment of the invention, the all the user-specific information, including the online history of the user is stored only on the client terminal 601 and never on the server 602 or any other server system. Thus, the privacy of the user information is achieved.

Thus, the request 604 to the VPN server/proxy may include information on the type of the advertisement to be provided to the user terminal. The information in the advertisement database 608 may be updated periodically in order to ensure that it is up to date. The owner of the VPN service and the advertising database 608 may charge third parties for placing their advertisement into the advertising database 608 and, thereby, subsidize the costs of the web VPN service.

Figure 7:
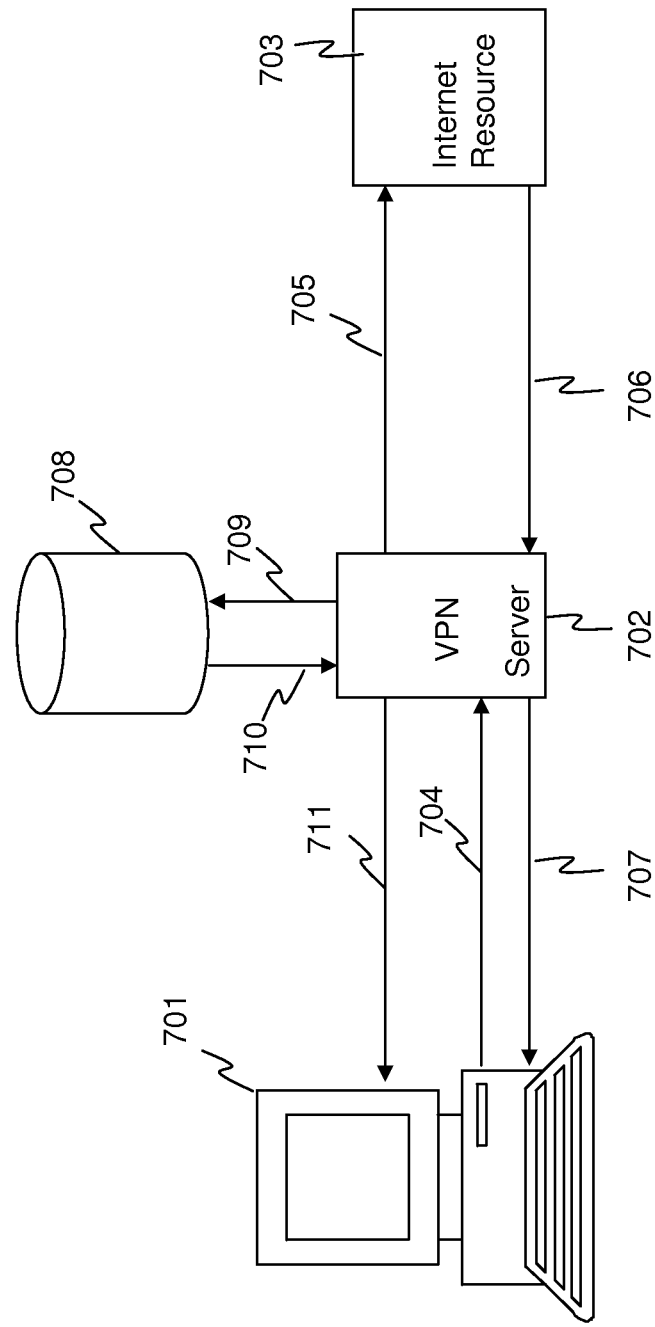
FIG. 7 is a block diagram illustrating another exemplary embodiment of inventive advertising-subsidized VPN system

FIG. 7 is a block diagram illustrating another exemplary embodiment of inventive advertising-subsidized VPN system. In this embodiment, the advertising database 708 is coupled with a VPN server/proxy 702, which operates to request an advertisement from the advertising database 708 using a request 709 and to receive the advertisement 710. After that, the VPN server/proxy 702 forwards the received advertisement to the client terminal 702, see 711. In this embodiment, the information specifying the advertisement, which is contained in the request 709 may be provided to the VPN server/proxy by the user terminal 701, being embedded, for example, into the request 704. In another embodiment, the user terminal 701 may send a separate special request to the VPN server/proxy for advertising information (not shown). As in the embodiment shown in FIG. 7, the decision on the type of the advertisement may be based on the user's prior online activities stored at the client terminal 701 as well as the nature of the user's request 704 and/or the nature of the information 707.

In one embodiment, the inventive advertisement sponsored VPN system may utilize the client side user data collection and advertisement insertion algorithm described in detail in U.S. patent publication No. 2006/0265283 A1, incorporated by reference herein in its entirety. In that or another embodiment, the inventive advertisement sponsored VPN server may be implemented using one or more features of the networking device with embedded advanced content and web traffic monetization functionality, as described in detail in U.S. patent publication No. 2006/0293962 A1, incorporated by reference herein in its entirety.

In one embodiment of the invention, the user is provided with an ability to select any IP address (from a choice of IP addresses corresponding to multiple counties) through the inventive web VPN system, thus enabling the user to choose what region of the world would be reflected his online identity. In the same or another embodiment of the invention, the user may select a language from a predetermined set of world languages that the user prefers or wishes to receive the content in.

The above features of the inventive methodology disrupt the ability of the ISP or governments to block particular Internet sites or online services in a given region, and creates a completely censorship free Internet experience.

In one embodiment of the inventive system, one server with multiple IP addresses is used. The service has at least one proxy server capable of sending requests to the content servers while using any of two or more IP addresses belonging to different countries. In accordance with an embodiment of the inventive concept, the user is able to specify conditions of IP address to use when establishing the tunnel (for instance, country or language) request from the proxy server to the content server is sent while using IP address corresponding to specified conditions.

In accordance with another embodiment of the invention, the inventive system provides advertisement targeting based on the user's IP address selection or language selection. In one embodiment of the invention, the user's language selection is used by the inventive system to choose the language in which the advertisement is presented to the user. In one embodiment of the invention, the user selects different geographical regions (country, zip code or language) to be presented to content providers and advertisers, while real user's geo region remains the same. The ad requests sent to the same database contain different geo region identifiers as selected by the user. The same user, connected to the same proxy server, receives different geo-targeted ads depending on the user's selection of geo region.

Figure 8:
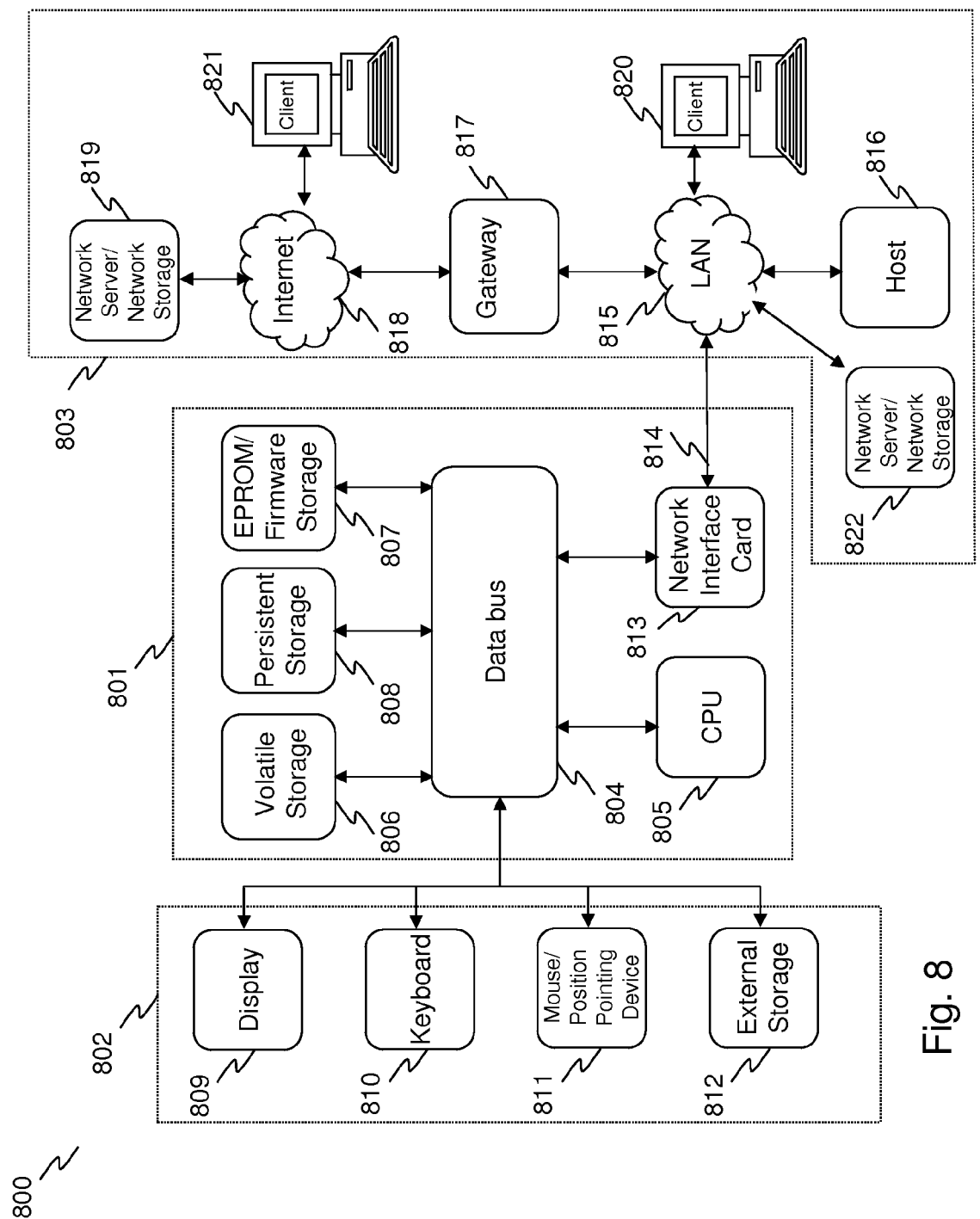
FIG. 8 illustrates an exemplary embodiment of a computer platform upon which the inventive system may be implemented.

FIG. 8 illustrates an exemplary embodiment of a computer platform upon which the inventive system may be implemented.

FIG. 8 is a block diagram that illustrates an embodiment of a computer/server system 800 upon which an embodiment of the inventive methodology may be implemented. The system 800 includes a computer/server platform 801, peripheral devices 802 and network resources 803.

The computer platform 801 may include a data bus 805 or other communication mechanism for communicating information across and among various parts of the computer platform 801, and a processor 805 coupled with bus 801 for processing information and performing other computational and control tasks. Computer platform 801 also includes a volatile storage 806, such as a random access memory (RAM) or other dynamic storage device, coupled to bus 805 for storing various information as well as instructions to be executed by processor 805. The volatile storage 806 also may be used for storing temporary variables or other intermediate information during execution of instructions by processor 805. Computer platform 801 may further include a read only memory (ROM or EPROM) 807 or other static storage device coupled to bus 805 for storing static information and instructions for processor 805, such as basic input-output system (BIOS), as well as various system configuration parameters. A persistent storage device 808, such as a magnetic disk, optical disk, or solid-state flash memory device is provided and coupled to bus 801 for storing information and instructions.

Computer platform 801 may be coupled via bus 805 to a display 809, such as a cathode ray tube (CRT), plasma display, or a liquid crystal display (LCD), for displaying information to a system administrator or user of the computer platform 801. An input device 810, including alphanumeric and other keys, is coupled to bus 801 for communicating information and command selections to processor 805. Another type of user input device is cursor control device 811, such as a mouse, a trackball, or cursor direction keys for communicating direction information and command selections to processor 805 and for controlling cursor movement on display 809. This input device typically has two degrees of freedom in two axes, a first axis (e.g., x) and a second axis (e.g., y), that allows the device to specify positions in a plane.

An external storage device 812 may be coupled to the computer platform 801 via bus 805 to provide an extra or removable storage capacity for the computer platform 801. In an embodiment of the computer system 800, the external removable storage device 812 may be used to facilitate exchange of data with other computer systems.

The invention is related to the use of computer system 800 for implementing the techniques described herein. In an embodiment, the inventive system may reside on a machine such as computer platform 801. According to one embodiment of the invention, the techniques described herein are performed by computer system 800 in response to processor 805 executing one or more sequences of one or more instructions contained in the volatile memory 806. Such instructions may be read into volatile memory 806 from another computer-readable medium, such as persistent storage device 808. Execution of the sequences of instructions contained in the volatile memory 806 causes processor 805 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 805 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 808. Volatile media includes dynamic memory, such as volatile storage 806.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 805 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 805. The bus 805 carries the data to the volatile storage 806, from which processor 805 retrieves and executes the instructions. The instructions received by the volatile memory 806 may optionally be stored on persistent storage device 808 either before or after execution by processor 805. The instructions may also be downloaded into the computer platform 801 via Internet using a variety of network data communication protocols well known in the art.

The computer platform 801 also includes a communication interface, such as network interface card 813 coupled to the data bus 805. Communication interface 813 provides a two-way data communication coupling to a network link 815 that is coupled to a local network 815. For example, communication interface 813 may be an integrated services digital network (ISDN) card or a modem to provide a data communication connection to a corresponding type of telephone line. As another example, communication interface 813 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 813 sends and receives electrical, electromagnetic or optical signals that carry digital data streams representing various types of information.

Network link 813 typically provides data communication through one or more networks to other network resources. For example, network link 815 may provide a connection through local network 815 to a host computer 816, or a network storage/server 817. Additionally or alternatively, the network link 813 may connect through gateway/firewall 817 to the wide-area or global network 818, such as an Internet. Thus, the computer platform 801 can access network resources located anywhere on the Internet 818, such as a remote network storage/server 819. On the other hand, the computer platform 801 may also be accessed by clients located anywhere on the local area network 815 and/or the Internet 818. The network clients 820 and 821 may themselves be implemented based on the computer platform similar to the platform 801.

Local network 815 and the Internet 818 both use electrical, electromagnetic or optical signals that carry digital data streams. The signals through the various networks and the signals on network link 815 and through communication interface 813, which carry the digital data to and from computer platform 801, are exemplary forms of carrier waves transporting the information.

Computer platform 801 can send messages and receive data, including program code, through the variety of network(s) including Internet 818 and LAN 815, network link 815 and communication interface 813. In the Internet example, when the system 801 acts as a network server, it might transmit a requested code or data for an application program running on client(s) 820 and/or 821 through Internet 818, gateway/firewall 817, local area network 815 and communication interface 813. Similarly, it may receive code from other network resources.

The received code may be executed by processor 805 as it is received, and/or stored in persistent or volatile storage devices 808 and 806, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the web VPN system. It is intended that the specification and examples be considered as exemplary only, with a true scope and spirit of the invention being indicated by the following claims.

What is claimed is:

1. A computerized system comprising:
   a. a virtual private network and a proxy server operable to provide a virtual private network service, the virtual private network service enabling a user of a user terminal to retrieve at least one user-requested Internet resource from a content provider, wherein the proxy server comprises at least a processing unit and a memory; and
   b. a web server communicatively coupled with the virtual private network and the proxy server and with the user terminal and operable to furnish the retrieved user-requested Internet resource to the user terminal via a secure data transmission protocol, wherein the web server is further operable to provide to the user terminal a control panel accessible using a web browser, the control panel comprising a uniform resource locator input portion, which is separate and distinct from a uniform resource locator input field of the browser, configured to receive a uniform resource locator of the user-requested Internet resource from the user and to transmit the uniform resource locator of the user-requested Internet resource to the virtual private network and the proxy server, and wherein the virtual private network and the proxy server is configured to keep an identity of the user private from the content provider; wherein the virtual private network and the proxy server is operable to receive from the user selection of a language from a plurality of predetermined languages, wherein the selection of the language indicates preferred content display language of the user and wherein online content of the user differs depending on the language selection and wherein the virtual private network and the proxy server is operable to receive a plurality of advertisements from the advertisement module; to choose a most relevant advertisement based on a selected geographical region; and to insert the most relevant advertisement into the Internet resource provided to the user.

2. The system of claim 1, wherein the virtual private network and the proxy server is operable to receive a plurality of advertisements from the advertisement module; to choose a most relevant advertisement based on the Internet resource specified by the user; and to insert the most relevant advertisement into the Internet resource provided to the user.

3. The system of claim 1, wherein the virtual private network and the proxy server is operable to receive from the user a selection of language wherein the virtual private network server is further operable to alter the user's online identity to reflect the selected language.

4. The system of claim 1, wherein the virtual private network and the proxy server is further operable to re-write links contained in the Internet resource furnished to the user to direct the user to linked resources via the virtual private network and the proxy server.

5. A computerized system comprising:
   a. a virtual private network and a proxy server operable to provide a virtual private network service, the virtual private network service enabling a user of a user terminal to retrieve at least one Internet resource from a content provider, wherein the proxy server comprises at least a processing unit and a memory; and
   b. a web server communicatively coupled with the virtual private network and the proxy server and with the user terminal and operable to furnish the retrieved Internet resource to the user terminal via a secure data transmission protocol, wherein the web server is further operable to provide the user terminal with a bookmarklet enabling the user to create a bookmark redirecting the user to the Internet resource through the virtual private network and the proxy server and wherein the virtual private network and the proxy server is configured to keep an identity of the user private from the content provider, wherein the virtual private network and the proxy server is operable to receive from the user selection of a language from a plurality of predetermined languages, wherein the selection of the language indicates preferred content display language of the user and wherein online content of the user differs depending on the language selection and wherein the virtual private network and the proxy server is operable to receive a plurality of advertisements from the advertisement module; to choose a most relevant advertisement based on a selected geographical region; and to insert the most relevant advertisement into the Internet resource provided to the user.

6. The system of claim 5, wherein the virtual private network and the proxy server is further operable to re-write links contained in the Internet resource furnished to the user to direct the user to linked resources via the virtual private network and the proxy server.

7. The system of claim 5, wherein the bookmarklet is executed by a web browser on the user terminal to create the bookmark redirecting the user to the Internet resource through the virtual private network and the proxy server.

8. The system of claim 7, wherein a button corresponding to the bookmarklet is placed on a toolbar of the web browser on the user terminal.

9. A computer-implemented method comprising:
a. providing a virtual private network service using a virtual private network and a proxy server, the virtual private network service enabling a user of a user terminal to retrieve at least one user-requested Internet resource from a content provider, wherein the proxy server comprises at least a processing unit and a memory; and
b. furnishing, via a secure data transmission protocol, the retrieved user-requested Internet resource to the user terminal using a web server communicatively coupled with the virtual private network and the proxy server and with the user terminal, wherein the web server is further operable to provide to the user terminal a control panel accessible using a web browser, the control panel comprising a uniform resource locator input portion, which is separate and distinct from a uniform resource locator input field of the browser, configured to receive a uniform resource locator of the user-requested Internet resource from the user and to transmit the uniform resource locator of the user-requested Internet resource to the virtual private network and the proxy server, and wherein the virtual private network and the proxy server is configured to keep an identity of the user private from the content provider; wherein the virtual private network and the proxy server is operable to receive from the user selection of a language from a plurality of predetermined languages, wherein the selection of the language indicates preferred content display language of the user and wherein online content of the user differs depending on the language selection and wherein the virtual private network and the proxy server is operable to receive a plurality of advertisements from the advertisement module; to choose a most relevant advertisement based on a selected geographical region; and to insert the most relevant advertisement into the Internet resource provided to the user.

10. The computer-implemented method of claim 9, wherein the virtual private network and the proxy server is operable to receive a plurality of advertisements from the advertisement module; to choose a most relevant advertisement based on the Internet resource specified by the user; and to insert the most relevant advertisement into the Internet resource provided to the user.

11. The computer-implemented method of claim 9, wherein the virtual private network and the proxy server is operable to receive from the user a selection of language wherein the virtual private network server is further operable to alter the user's online identity to reflect the selected language.

12. The computer-implemented method of claim 9, wherein the virtual private network and the proxy server is further operable to re-write links contained in the Internet resource furnished to the user to direct the user to linked resources via the virtual private network and the proxy server.

* * * * *